United States Patent [19]

Smigerski

[11] Patent Number: 4,828,714

[45] Date of Patent: May 9, 1989

[54] METHOD OF PROCESSING FINELY DIVIDED SOLIDS WHICH HAVE SEPARATED OUT IN LIQUIDS

[75] Inventor: Hans-Juergen Smigerski, Marl, Fed. Rep. of Germany

[73] Assignee: Huels Aktiengesellschaft, Marl, Fed. Rep. of Germany

[21] Appl. No.: 176,149

[22] Filed: Mar. 31, 1988

[30] Foreign Application Priority Data

Jul. 1, 1987 [DE] Fed. Rep. of Germany ....... 3721769

[51] Int. Cl.$^4$ .............................................. B01D 21/00
[52] U.S. Cl. .................................... 210/710; 210/771; 210/787
[58] Field of Search ................ 525/316; 210/771, 787, 210/710

[56] References Cited

U.S. PATENT DOCUMENTS 4,115,477  9/1978  Morris .............................. 525/316 X Primary Examiner—Frank Spear
Attorney, Agent, or Firm—Oblon, Fisher, Spivak, McClelland & Maier

[57] ABSTRACT

A method of processing finely divided solids which have precipitated or separated out in a liquid. The suspended finely divided solid is converted into a pourable powder with negligible dust content and narrow particle size distribution, without detrimental particle alteration. The suspension is charged into a centrifuge, which may be a reversible-filter centrifuge. The solids are preferably centrifuged at a centrifugal pressure of 0.05–0.5 MPa for 0.5–5 min, and are then gently removed from the centrifuge, to be dried gently in a vibrating fluidized-bed dryer. The method is particularly suitable for processing precipitated synthetic rubbers (which may contain fillers as well) into a pourable powder which retains pourability after storage.

4 Claims, No Drawings

METHOD OF PROCESSING FINELY DIVIDED SOLIDS WHICH HAVE SEPARATED OUT IN LIQUIDS

BACKGROUND OF THE INVENTION

1. Field of the Invention

The invention relates to a method of processing solids which have separated out in finely divided form in a liquid and which are to be processed to a dry, pourable powder with low dust content.

2. Discussion of the Background

Among the solids subject to the present method are, e.g., natural or synthetic rubbers which have precipitated out of aqueous suspensions or solutions, and which solids may also contain fillers. Manufacture of such pulverulent rubbers is described, for example, in Ger. OS No. 28 22 148, OS No. 36 06 742, and OS No. 36 06 743. Fillers which may be used include carbon black or active silicic acid, or the usual inactive fillers used in rubber compounding, as well as other components of the finished rubber product.

It is known to separate finely divided solids from suspensions by sedimentation. In the case of fine particles and small differences between the density of the solid and that of the liquid, impracticably long sedimentation times result. Accordingly, centrifuges are employed to reduce the sedimentation time. While centrifuges very effectively separate out the solid, particle damage or detrimental particle alteration is unavoidable, resulting from the mechanical transport processes (1978 *Aufbereitungs-Technik*, 19, 10:481–483). Breakage of particles and wear of their surfaces is observed. The result is a powder with low pourability and high dust content. Relatively soft components within the particles are liberated or exposed, whereby clumps can develop.

In the subsequent thermal drying of the powder which has been separated out, one strives for intimate contact between the powder being dried and the drying gas or the apparatus walls which may be heated. If a rapidly moving stirring device or a drying gas with high flow speed is employed for this agitation purpose, additional damage to the particles, comparable to that suffered in the separation, is unavoidable.

Accordingly, there exists a need for a process whereby a finely divided solid which has been separated out in a liquid can be converted to a pourable powder with negligible dust content, maximally narrow particle size distribution, and no damage to the particles.

SUMMARY OF THE INVENTION

Accordingly, one object of the present invention is to provide a method for processing finely divided solids which have precipitated or separated out in a liquid, wherein the process produces a pourable powder with negligible dust content.

Another object of the invention is to provide a method in which a narrow particle sized distribution is obtained with little damage to the particles.

These and other objects which will become apparent from the following specification have been achieved by the present method of processing a finely divided solid which comprises the steps of (i) charging a solids-containing liquid to a separating means comprising a centrifuge or a vacuum or pressure filter, (ii) separating the solids from the liquid, and (iii) drying the separated solids in a drying means.

DETAILED DESCRIPTION OF THE PREFERRED EMBODIMENTS

The type of finely divided solids in a liquid, which may be used in the present invention include any finely divided solid material which is generally prepared or processed in a liquid medium and must thereafter be separated from the liquid. Suitable solids include all natural and synthetic polymers which can exist as a finely divided solid phase, wherein the solid phase is precipitated or separated out in the presence of a liquid medium. Accordingly, soluble polymers are not considered to be within the scope of the present invention.

Preferred solids include natural and synthetic rubbers which have precipitated or separated out of aqueous suspensions or solutions. The rubbers may exist as pure rubber or may contain fillers such as carbon black, silicic acid, or conventional inactive fillers. Particularly preferred, are finely divided synthetic rubber solids which have fillers present in the amount of 20–500 parts per hundred parts rubber, more preferably 40–200 parts filler per hundred parts rubber. The synthetic rubber may further comprise additional adjuvants such as low molecular weight hydrocarbons and precipitating agents.

The method of the present invention comprises two steps. In the first step, the solid which has separated out is dewatered, and in the second step it is thermally dried.

In the first step, the dispersion or suspension is charged to a centrifuge and centrifuged to a certain residual moisture content in the separated solids. The moisture content depends on the particular solids which are used. The product is then gently removed from the centrifuge and is mechanically grossly broken up.

The centrifuge is generally operated at a centrifuging pressure of about 0.05–0.5 MPa for a time period in the range of about 0.5–5 minutes. However, centrifuging pressures slightly above or below this range may be used so long as the finely divided solid is adequately separated from the liquid. Likewise, the centrifuging time is determined by the length of time required to obtain an adequate separation of the solids from the liquid and may vary either above or below the range noted above.

In lieu of a centrifuge, a vacuum or pressure filter in belt, disc, or drum form may be employed as the separating means; however, with such devices the residual moisture will be greater.

A filter centrifuge with either a slicing blade or a pneumatic-mechanical expeller may also be suitable, but great care should be taken to avoid damaging the product when removing it from the device.

The reversible-filter centrifuge (1983 *Chem.-Ing. Tech.*, 55, 11:840–845) has proved particularly advantageous. This device enables the separated solids to be simply and gently removed and loosened. A reversible-filter centrifuge with a hydraulic drive has a short speedup time and a short braking time, each amounting to only a few seconds. The time required to reverse the filter is also only a few seconds.

If a filter centrifuge is used having a drum diameter of 0.6 m, a filler-containing synthetic rubber is dewatered to residual moisture content 40%, at a drum speed of 1000 rpm. The solids produced are loose and almost pourable.

In the second step, the solids obtained from the first step are dried. Suitable apparatus for this provide gentle agitation for the solids, with low relative speed between the particles themselves and between the particles and the walls of the apparatus, where a gas stream simultaneously removes the moisture.

Suitable drying means include paddle dryers with jacket heating and gas circulation, or tumble dryers with gas circulation or vacuum drying. Also, vacuum rotary disc dryers with slow rotation and slicing blades. One may also use stationary fluidized-bed dryers with stirring means and gas circulation.

Particularly advantageous are vibrating fluidized-beddriers, with or without stirring implements, with hot gas circulation and with an unbalanced drive with a frequency of, e.g., about 200 Hz.

The inventive process has the following advantages:

The finely divided solids, which have separated out in the liquid and have been centrifuged therefrom, leave the centrifuge as a moist but nearly pourable powder. Before the particles are fed to the fluidized-bed dryer, they still have an aqueous film in their interparticle interstices.

The dewatering in the reversible-filter centrifuge and the drying in the vibrating fluidized-bed dryer are very gentle to the material.

The particle structure, particle size distribution, and surface properties of the solids suspended in the liquid are substantially fully retained with the use of the inventive dewatering and drying techniques. To an extend, these properties may even be improved by the inventive process.

The dry solids have negligible dust content, and are readily pourable.

The residual moisture in the dry solids is controllable within a definite range.

The residual moisture is very uniformly distributed through the dry solids; there are no pockets of increased moisture.

The particle sizes of the finely divided solids prepared by the inventive process are in the range 0.1–5 mm. The lower limit is imposed by the requirement of dust-free processibility of the powder. The upper limit is due to the need for a fast drying time, since drying time is a function of the length of the diffusion path and the rate of diffusion of moisture in the particle.

The residual moisture after drying is 0.1–30 wt.%, and depends on the type of the finely divided solids, the purpose for which the solids are to be used, and the desired pourability.

Other features of the invention will become apparent in the course of the following descriptions of exemplary embodiments which are given for illustration of the invention and are not intended to be limiting thereof.

EXAMPLES

Example 1

An essentially aqueous liquid was used, which contained 63 g/liter synthetic rubber which had been precipitated and suspended therein, plus 200 phr (parts per hundred parts rubber) carbon black as a filler.

This suspension was fed at 32 liter/min to a hydraulically driven reversible-filter centrifuge having filter drum diameter of 60 cm and filter width of 22 cm, operating at about 1200 rpm. After 2 min of centrifuge running time, the feed of the suspension was interrupted. The centrifuging was continued for an additional minute. In each such cycle, 13 kg residue with residual moisture of 70% was obtained from the filter, in the form of a porous aggregate. Virtually no solid residue remained in the filter.

The synthetic rubber powder from the reversiblefilter centrifuge, dewatered but still moist, was charged to a vibrating fluidized-bed dryer with an unbalanced drive having a vibration frequency of about 200 Hz. The dryer had an actual flow cross sectional area of 0.7 m$^2$, and the hot air flow in it was at 150° C. The equivalent velocity of the hot air (empty conduit basis) was 0.35 m/sec. The surface loading of the fluidized bed was 43 kg/m$^2$/hr. With a mean drying time of 5 min, 30 kg/hr dry synthetic rubber powder with residual moisture of 0.8% was obtained from the dryer.

The dry synthetic rubber powder had negligible dust content and was readily pourable. The pourability was determined by the method of Jenike (1982 *Aufbereitungs-Technik*, 15, (8):411–422; and 1967 *Powder Technol*, 1, 237–244).

The yield pressure of the synthetic rubber powder by the Jenike test was <500 N/m$^2$, after 24 hr at 50° C. and a consolidating pressure of 1000 N/m$^2$. Thus, the powder is storable in a silo.

Example 2

The procedure was analogous to that of Example 1, but with a different precipitated synthetic rubber, in a concentrated suspension, and with different conditions chosen for the dewatering and drying. The chief parameters and results for the two Examples are given in the following Table.

Obviously, numerous modifications and variations of the present invention are possible in light of the above teachings. It is therefore to be understood that within the scope of the appended claims, the invention may be practiced otherwise than as specifically described herein.

TABLE

Summary of Examples 1 and 2:

|  | Ex. 1 | Ex. 2 | Units |
|---|---|---|---|
| Filler content of the precipitated synthetic rubber | 200 | 40 | phr |
| Solids content of the suspension | 63 | 128 | g/l |
| *Dewatering in the Reversible-Filter Centrifuge* | | | |
| Rpm of drum | 1,200 | 1,100 | rpm |
| Feed rate of suspension | 32 | 24 | l/min |
| Time occupied in filling the running centrifuge | 2 | 2 | min |
| Additional centrifuging time after filling | 1 | 1 | min |
| Cycle time | 3 | 3 | min |
| Amount of moist solids yielded per cycle | 13 | 10 | kg |
| Moisture content of the dewatered solids | 70 | 40 | % |
| Amount of solids yielded per cycle (dry basis) | 4 | 6 | kg |
| Solids throughput (dry basis) | 80 | 120 | kg/h |
| *Drying in the Fluidized-Bed Dryer* | | | |
| Air temperature | 150 | 120 | °C. |
| Air throughput | 1,100 | 900 | m$^3$/h |
| Drying time | 5 | 2.5 | min |
| Throughput of dried solids | 30 | 35 | kg/h |
| Residual moisture content of dried solids | 0.8 | 0.5 | % |

What is claimed as new and desired to be secured by Letters Patent of the United States is:

1. A method of processing a finely divided solid which is precipitated or separated out in a liquid, consisting essentially of the steps of:

(i) charging a solids-containing liquid to a centrifuge;

(ii) centrifuging such solids containing liquid at a centrifuging pressure of 0.05–0.5 MPa for 0.5–5 minutes;
(iii) removing the centrifuged solids from the centrifuge; and
(iv) drying said centrifuged solids in a vibrating fluidized-bed dryer.

2. The method of claim 2, wherein said finely divided solid, comprises a synthetic rubber which comprises fillers in the amount of 20–500 parts per hundred parts rubber.

3. The method of claim 2, wherein said synthetic rubber comprises fillers in an amount of 40–200 parts per hundred parts rubber.

4. The method of claim 2, wherein said synthetic rubber further comprises at least one adjuvant selected from the group consisting of low molecular weight hydrocarbons and precipitating agents.

* * * * *